US011872164B2

(12) United States Patent
Garrity

(10) Patent No.: US 11,872,164 B2
(45) Date of Patent: Jan. 16, 2024

(54) MODULES FOR SUBMERGED HYPERBARIC OXYGEN THERAPY AND RELATED METHODS AND SYSTEMS

(71) Applicant: 2388634 ALBERTA LTD., Calgary (CA)

(72) Inventor: Marc Garrity, Calgary (CA)

(73) Assignee: 2388634 ALBERTA LTD., Calgary (CA)

( * ) Notice: Subject to any disclaimer, the term of this patent is extended or adjusted under 35 U.S.C. 154(b) by 0 days.

(21) Appl. No.: 17/799,605

(22) PCT Filed: Jan. 28, 2022

(86) PCT No.: PCT/CA2022/050127
§ 371 (c)(1),
(2) Date: Aug. 12, 2022

(87) PCT Pub. No.: WO2022/204784
PCT Pub. Date: Oct. 6, 2022

(65) Prior Publication Data
US 2023/0122486 A1 Apr. 20, 2023

(30) Foreign Application Priority Data
Apr. 1, 2021 (CA) ................................ CA 3114035

(51) Int. Cl.
*A61G 10/00* (2006.01)
*A61G 10/02* (2006.01)

(52) U.S. Cl.
CPC .................................. *A61G 10/026* (2013.01)

(58) Field of Classification Search
CPC ...... A61G 10/00; A61G 10/005; A61G 10/02; A61G 10/023; A61G 10/026; A61G 10/04
See application file for complete search history.

(56) References Cited

U.S. PATENT DOCUMENTS 5,360,001 A 11/1994 Brill et al.
10,898,121 B2 * 1/2021 Williams ............. A61B 5/6888
(Continued)

FOREIGN PATENT DOCUMENTS

CN 111265378 A 6/2020
EP 0 945 116 A2 3/1999

OTHER PUBLICATIONS

International Search Report and Written Opinion for PCT/CA2022/050127, completed on Mar. 17, 2022, in 8 pages.
(Continued)

*Primary Examiner* — LaToya M Louis
(74) *Attorney, Agent, or Firm* — Procopio, Cory, Hargreaves & Savitch LLP

(57) ABSTRACT

Disclosed herein are modules for performing hyperbaric oxygen therapy ("HBOT") on a patient submerged in pressurized water where substantially no gas is present in the module. The modules generally have an entry, a fluid inlet for introducing water into the module, first and second fluid outlets positioned substantially at a base and a top of the module respectively, and a utilities inlet and outlet in part for transferring breathing air to and from the patient. The module permits HBOT treatment on a patient submerged in water with no air in the module, thus reducing the risk of fire or explosion. Methods and systems are also contemplated. Disclosed herein are methods of filling a module with water until there is substantially no gas in the module, and providing the patient in the module with treatment air during HBOT treatment.

18 Claims, 4 Drawing Sheets

(56) References Cited

U.S. PATENT DOCUMENTS

| | | | | |
|---|---|---|---|---|
| 2007/0175475 | A1* | 8/2007 | Grauke | A61G 10/026 128/205.26 |
| 2008/0066758 | A1 | 3/2008 | Richardson | |
| 2018/0168925 | A1 | 6/2018 | Wozniak | |
| 2020/0008996 | A1 | 1/2020 | Zack | |
| 2020/0323197 | A1* | 10/2020 | Tchirikov | A61M 1/3621 |

OTHER PUBLICATIONS

Official Action dated Oct. 15, 2021 for corresponding CA Patent Application No. 3, 114,035, in 4 pages.
Response to Official Action filed on Nov. 8, 2021 in corresponding CA Patent Application No. 3,114,035, in 5 pages.
Notice of Allowance dated Nov. 19, 2021 for corresponding CA Patent Application No. 3,114,035, in 1 page.

* cited by examiner

MODULES FOR SUBMERGED HYPERBARIC OXYGEN THERAPY AND RELATED METHODS AND SYSTEMS

FIELD OF THE DISCLOSURE

The present disclosure relates generally to hyperbaric oxygen therapy ("HBOT") and more particularly to modules for submerged hyperbaric oxygen therapy modules and related methods and systems.

BACKGROUND

HBOT has a long and rich history dating at least as far back as 1662 when it was first attempted by Nathanial Henshaw.

HBOT is presently used to treat a number of medical issues including both acute and chronic conditions. Some examples of acute conditions that may respond positively to HBOT include decompression sickness, carbon monoxide poisoning, sudden sensorineural hearing loss, and central retinal arterial occlusion. Some examples of chronic conditions that may respond positively to HBOT include non-healing wounds, osteoradionecrosis, hematuria, and rectovaginal fistulas.

In modern applications HBOT may be performed using a HBOT chamber adapted to receive both a patient and pressurized gas. The patient is positioned in the chamber and the chamber is sealed. The gas pressure in the chamber is increased to a treatment pressure and the patient cycles through a treatment regime alternating between periods of time where the receive oxygen enriched air and air with a normal oxygen content.

SUMMARY

According to one embodiment there is provided a module for performing hyperbaric oxygen therapy ("HBOT") on a patient submerged in pressurized water where substantially no gas is present in the module, the module having: an entry point; a fluid inlet for introducing pressurized water into the module; a first fluid outlet positioned substantially at a base of the module; a second fluid outlet positioned substantially at a top of the module; a utilities inlet comprising a breathing air inlet for delivering breathing air to means for delivering the breathing air to the patient; and a utilities outlet comprising a breathing air outlet for receiving spent breathing air from means for receiving the spent breathing air from the patient.

In some embodiments the pressurized water may be pressurized by a pump.

In some embodiments the pressurized water may be pressurized by a column of standing water extending above and fluidly connected to the module, with a valve disposed between the column of standing water and the fluid inlet.

In some embodiments the module may have a second fluid inlet for introducing further pressurized water to the module, the pressurized water introduced by the second fluid inlet being pressurized by a pump.

In some embodiments a drain line may be disposed on the column of standing water proximal to the valve.

In some embodiments when the module is pressurized with pressurized water, the pressure of the pressurized water in the module is between about 1.5 atm and about 4 atm.

In some embodiments when the module is pressurized with pressurized water, the pressure of the pressurized water in the module is between about 2 atm and about 3 atm.

In some embodiments the fluid inlet may be fluidly connected to a source of steam for sterilizing the module.

In some embodiments the second fluid inlet may be fluidly connected to a source of steam for sterilizing the module.

In some embodiments the source of steam may include a source of distilled water being passed through a boiler.

In some embodiments the breathing air may be any one of: medical air; oxygen enriched medical air; or 100% oxygen.

In some embodiments the utilities outlet may include one or more connections adapted for any one or more of: measuring pressure in the module; measuring temperature in the module; and/or measuring water level in the module.

In some embodiments the utilities inlet and utilities outlet may include one or more connections adapted for any one or more of: providing an Intravenous Line ("IV") to the patient; connecting an Electrocardiogram ("ECG") monitor to the patient; connecting a pulse oximeter to the patient; and/or providing suction drainage to the patient.

In some embodiments the module may further include a window adapted to permit visual monitoring of the patient.

In some embodiments the module may be selectively fluidly connected to one or more further modules.

According to yet a further embodiment there is provided a use of the module described herein for performing HBOT on a patient submerged in pressurized water in the module where substantially no gas is present in the module.

According to yet a further embodiment there is provided a method for performing HBOT on a patient submerged in pressurized water in a module where substantially no gas is present in the module, the method including the steps of: positioning a patient in the module; providing the patient with medical air by a breathing air inlet of the module connected to the patient by means for delivering breathing air to the patient; receiving spent medical air from the patient at a breathing air outlet of the module connected to the patient by means for receiving spent breathing air from the patient; filling the module with water until there is substantially no gas in the module; providing the patient with HBOT treatment air by the breathing air inlet; receiving spent HBOT treatment air at the breathing air outlet of the module; and pressurizing the water in the module to a treatment pressure.

In some embodiments the step of filling the module with water until there is substantially no gas in the module may include introducing pressurized water into a fluid inlet while gas is displaced from the module through a fluid outlet.

In some embodiments the HBOT treatment air may be any one of: oxygen enriched medical air; or 100% oxygen.

In some embodiments the treatment pressure may be between about 1.5 atm and about 4 atm.

In some embodiments the treatment pressure may be between about 2 atm and about 3 atm.

In some embodiments the method may further include the step of depressurizing the pressurized water in the module to atmospheric pressure.

In some embodiments the water is chlorinated water.

According to yet a further embodiment there is provided a system for performing HBOT on a patient submerged in pressurized water in a module where substantially no gas is present in the module, the system including: a module described herein; means for providing pressurized water to the module; and means for providing pressurized steam to the module for sterilizing the module.

In some embodiments the means for providing pressurized water to the module may include the pump described herein.

In some embodiments the means for providing pressurized water to the module may include the column of standing water described herein.

In some embodiments the means for providing pressurized steam to the module for sterilizing the module may include the source of steam for sterilizing the module.

BRIEF DESCRIPTION OF THE DRAWINGS

Various objects, features and advantages of the invention will be apparent from the following description of particular embodiments of the invention, as illustrated in the accompanying drawings.

DETAILED DESCRIPTION

Introduction and Rationale

Figure 1:
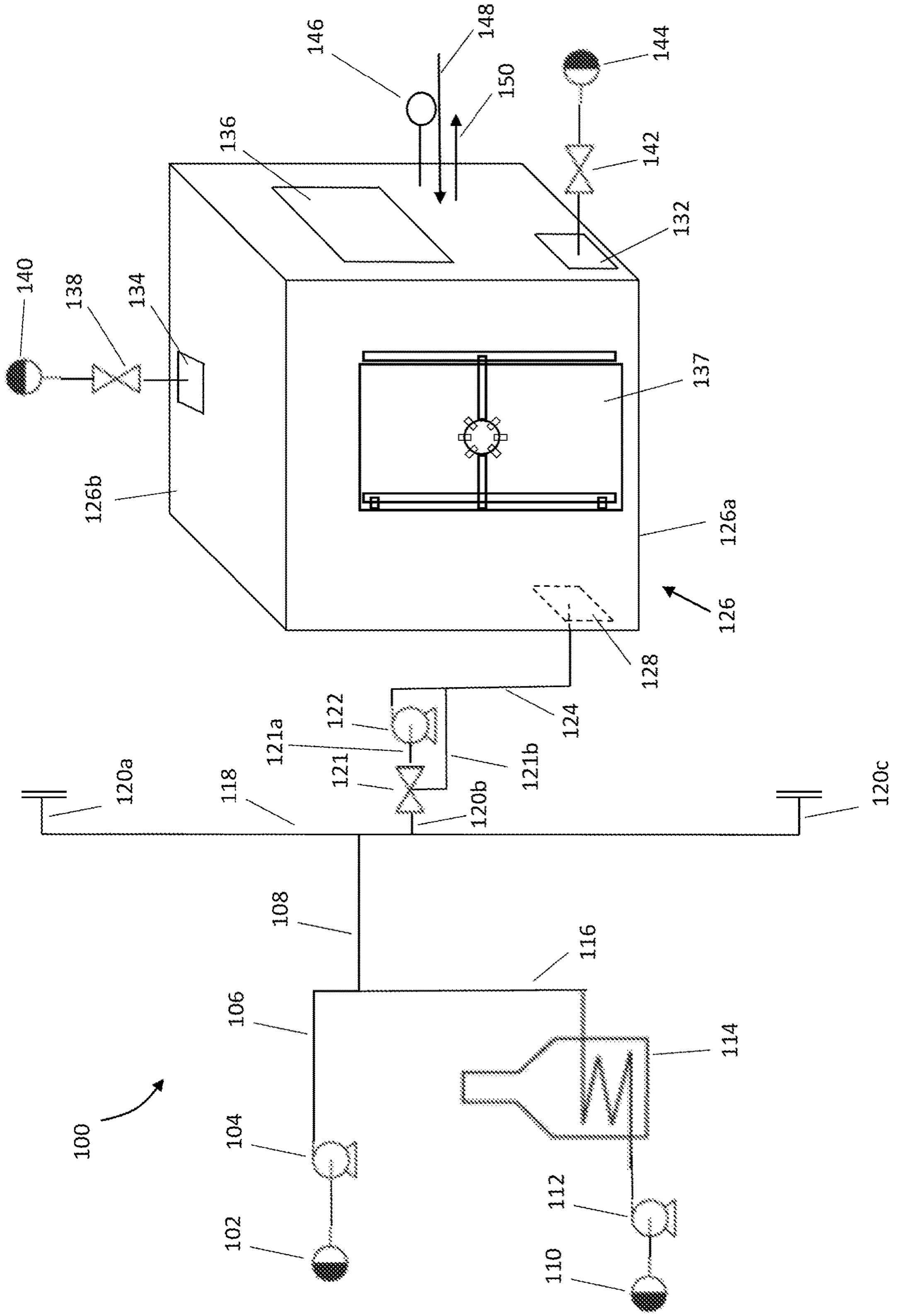
FIG. 1 is a schematic diagram of a system having a HBOT treatment module, according to an embodiment.

HBOT therapy most commonly involves a chamber for holding one or more patients and breathing gas pressurized between about 1.5 atm (abs) and about 4 atm (abs). In certain less common applications HBOT may be performed with a headspace for receiving both the head of a patient and pressurized gas. One such system is disclosed in M Sargusingh *Hydrostatic Hyperbaric Chamber Ventilation System*, American Institute of Aeronautics and Astronautics, 2011.

The inventor of the present application, having experience with known HBOT equipment and methods and having perceived a need for improving HBOT equipment and methods, observed certain limitations in traditional HBOT therapy.

A primary drawback is that compressed oxygen-enriched air, including 100% oxygen as used in traditional HBOT therapy, carries an inherent risk of fire and explosion. Further drawbacks include: the high pneumatic consumption cost associated with having to compress relatively large volumes of air; a difficulty in sterilizing a HBOT chamber; and the relatively large volume of gas that needs to be exhausted from the chamber in the event of emergency evacuation.

Certain of these drawbacks may be mitigated, but not completely avoided, by any one or more of: including fire suppression systems, such as sprinklers, in the HBOT chamber; reducing the risk that oxygen may be retained on the patient after decompression such as by having the patient using the chamber wear special clothing or use special wound dressings; and/or positioning many HBOT chambers in the same location, thereby gaining certain efficiencies of scale in air consumption cost.

The present application is concerned with providing a module and related methods and systems that aim to address one or more of the above-stated limitations of traditional HBOT.

Terminology

The terminology used herein is for the purpose of describing particular embodiments only and is not intended to be limiting of the invention.

As used herein, the singular forms “a”, “an” and “the” are intended to include the plural forms as well, unless the context clearly indicates otherwise. It will be further understood that the terms “comprises” and/or “comprising”, when used in this specification, specify the presented of stated features, steps, operations, elements, and/or components, but do not preclude the presence or addition of one or more other features, steps, operations, elements, components, and/or groups thereof. As used herein, the term “and/or” includes any and all combination of one or more of the associated listed items.

Spatially relative terms, such as “forward”, “side”, “top”, “bottom” and the like, may be used herein for ease of description to describe one element of feature’s relationship to another element or feature as illustrated in the features. It will be understood that the spatially relative terms are intended to encompass different orientations of the device in use or operation in addition to the orientation depicted in the figures.

It will be understood that when an element is referred to as being “on”, “attached to”, “connected to”, “coupled with”, “contacting”, “communicating with” etc, another element, it can be directly on, attached to, connected to, coupled with, contacting or communicating with the other element or intervening elements may also be present.

It will be understood that, although the terms “first”, “second”, etc may be used herein to describe various elements, these elements should not be limited by those terms. These terms are only used to distinguish one element from another. Thus, a “first” element, or component discussed herein could also be termed a “second” element without departing from the teachings of the present invention.

All pressures will be given on an absolute basis unless specifically provided otherwise.

Various aspects of the invention will now be described with reference to the figures. The invention may, however, be embodied in many different forms and should not be construed as limited to the embodiments set forth herein; rather, these embodiments are provided so that this disclosure will be thorough and complete, and will fully convey the scope of the invention to those skilled in the art.

Module and Associated Systems

Turning now to FIG. 1. FIG. 1 is a schematic diagram of a system 100 having a module 126, according to an embodiment. While one module 126 is shown in FIG. 1 any number of modules including ones similar to the module 126 and associated systems and equipment could be connected to a header line 118 as described below. Therefore, the module 126 may be one module of a series of one or more further modules for performing HBOT.

Two process inputs are provided to the system 100.

The first process input is process input 102, which is water provided to a pump 104. The pump 104 conveys the water through process line 106 fluidly connected to gathering line 108, which in turn is fluidly connected to the header line 118. The water at process input 102 may be chlorinated water supplied by a chlorinated water supply tank. The water may be already heated to between about 35° C. to about 38° C. at the process input 102 and/or a heat exchanger may be present in the system 100 so that the water conveyed towards the module 126 is of a temperature suitable for patient immersion.

The second process input is process input 110, which is water provided to a pump 112. The pump 112 conveys the water to a boiler 114 where steam is generated from the water. The steam is conveyed from the boiler 114 to the header line 118 via the process line 116 and the gathering line 108 by a pressure differential. In certain embodiments the water at process input 110 may be distilled water or any other water suitable for steam generation in the boiler 114.

In general, only one of process inputs 102,110 are active at any given time during the filling and HBOT treatment, or sterilization steps, respectively, as described herein.

The header line 118 is fluidly connected to three process lines 120*a*,120*b*,120*c*. In FIG. 1 process lines 120*a* and 120*c* terminate with blind flanges although it is contemplated that process lines 120*a* and 120*c* may be fluidly connected to further modules for performing HBOT on a patient that may be similar to the module 126.

Process line 120*b* is connected to a valve 121 that may selectively fluidly isolate the module 126 from other modules or other parts of the system 100. The valve 121 also selectively conveys water through process line 121*a* to a pump 122 and steam through bypass line 121*b*.

The pump 122 is for pressurizing the water and conveying the pressurized water to a fluid inlet 128 of the module 126 via the process line 124.

The module 126 generally has an entry point 137, the fluid inlet 128, a first fluid outlet 132 positioned substantially at a base 126*a* of the module, a second fluid outlet 134 positioned substantially at a top 126*b* of the module, a utilities inlet 148 and a utilities outlet 150. While not required in every embodiment, the module 126 further has a window 136 and exemplary connection 146 for measuring certain parameters in the module. The entry point 137 shown in FIG. 1 is a door adapted to withstand and maintain a seal against the module 126 when the module is pressurized internally.

The first fluid outlet 132 is connected to a valve 142 which selectively, fluidly connects the first fluid outlet 132 to a process termination 144. The second fluid outlet 134 is connected to a valve 138 which selectively, fluidly connects the second fluid outlet 134 to a process termination 140. In certain embodiments the process terminations 140,144 may be a sewer.

The operation of the system 100 will now be described in view of an exemplary HBOT treatment process.

Before HBOT treatment a patient is positioned in the module 126 via the entry point 137 on the module 126. The patient is provided with a means for delivering breathing air and a means for receiving the spent breathing air, which respectively convey breathing air from the utilities inlet 148 to the patient and convey spent breathing air from the patient to the utilities outlet 150. The utilities outlet 150 may vent the spent breathing air to an external location. The means for delivering breathing air and receiving spent breathing air may seal against the patient so that substantially no air is introduced into the module 126 via the breathing means. In an alternative embodiment, any air introduced into the module 126, for example spent breathing air exhaled by the patient or spent breathing air escaping the seal between the breathing means and the patient if the seal is imperfect, may be removed such as by a bleeder valve as described below. As substantially no breathing air is communicated into the module 126 from the breathing means, or alternatively the air is removed from the module before substantial accumulation, there is no elevated risk of fire or explosion in the module.

During HBOT treatment an attendant may monitor the patient visually by the window 136. Alternatively or additionally, an attendant may be present in the module 126 with, for example, their own means for delivering breathing air and receiving spent breathing air connect to the utilities inlet 148 and the utilities outlet 150, respectively. In certain embodiments the utilities inlet 148 and utilities outlet 150 may include connections for providing one or more Intravenous Line(s)("IV(s)") to the patient; connecting an Electrocardiogram ("ECG") monitor to the patient; connecting a pulse oximeter to the patient and/or providing suction drainage to the patient. In some embodiments, the utilities inlet 148 and utilities outlet 150 may include a hydrophone connection for connecting a hydrophone in the module 126 to a speaker monitored by the attendant. In embodiments where the utilities inlet 148 and/or utilities outlet includes connections to provide suction drainage to the patient, the suction drainage may be used to remove urine and/or wound exudate from the patient without that urine or exudate contacting the water in the module 126. Suction drainage may be effected by any known means including, for example, using a suction catheter connected to a Hemovac drain.

Once the patient is positioned in the module 126, breathing air flow is established and any desired monitoring or intervention equipment is activated or attached to the patient, the entry point 137 is closed and sealed.

Water is conveyed from the process input 102 to the process line 120*b* by the pump 104. The valve 121 selectively conveys the water to the pump 122 by the process line 121*a*. The pump 122 pressurizes the water and conveys it towards the module 126. The pressurized water enters the module 126 via the fluid inlet 128 thereby filling the module.

At the time when the module 126 is filing with water the valve 142 is closed to retain water in the module, and the valve 138 is open to allow air in the module 126 to escape as the module is filled. While the module 126 is filling the temperature, pressure and water level in the module may be monitored via the exemplary connection 146, which may have, for example, one or more of a pressure transducer, a thermocouple and/or or a liquid level sensor connected thereto.

Once the module 126 is substantially filled with water the valve 138 is closed. If the patient is not already being provided with a treatment air of oxygen enriched medical air or 100% oxygen they may be switched to the treatment air supply. The pump 122 continues to convey water to the module until a treatment pressure is reached. In certain embodiments the treatment pressure is between about 1.5 atm and about 4 atm. In preferred embodiments the treatment pressure is between about 2 atm and about 3 atm. While pressure in the module 126 is increased the pressure of the breathing air supplied to the patient is correspondingly increased to ensure sufficient airflow.

A treatment regime may include holding the pressure in the tank at about 2.5 atm while providing the patient with 100% oxygen for 30 minutes. After the initial 30 minute treatment the patient may be switched back to and medical air for 10 minutes before being exposed to another 30 minute cycle of 100% oxygen, a further 10 minutes of medical air and a final 30 minutes of 100% oxygen.

During treatment, the pressure in the module 126 may be changed by selectively conveying a small volume of fluid to the module 126 via the fluid inlet 128 or away from the module via either one or both of the fluid outlets 132,134. Because of the relatively low compressibility of water as compared to a gas and the relatively low cost of water pumps as compared to gas compressors, the cost to pressurize the module 126 may be relatively small.

After treatment the patient will then undergo decompression which includes reducing the pressure in the module 126 at a controlled rate. In one embodiment decompression may involve selectively opening one or both of the fluid outlets 132,134 in a controlled manner. Once the module 126 has returned to atmospheric pressure the module may then be drained via the first fluid outlet 132, for example, towards process output 144. Once the module 126 is at atmospheric pressure and the water is substantially drained, the patient may egress the module.

After the patient has egressed the module 126, the module may be sterilized. Sterilization features and functionalities are optional and are not required in all embodiments. In certain embodiments the module 126 may be sterilized by other known methods such as by hand cleaning the module with disinfectant. Nevertheless, in the embodiment shown in FIG. 1 sterilization may be achieved by supplying pressurized steam to the module 126. The pressurized steam is created by passing the process input 110 through the boiler 114 and conveying the pressurized steam to the module 126 via the process lines 116,108,118,120*b*,121*b*,124. In one implementation the pressurized steam may be supplied to the fluid inlet 128 while one or both of the valves 138,142 are open. When the temperature in the module 126 is at or above 121° C. the valves 138,142 are closed while further steam is introduced to increase the pressure in the module 126 to at or above about 2 atm. Holding the module 126 at 121° C. and 2 atm for about 30 minutes effectively permits the module 126 to function as an autoclave thereby self-sterilizing. In other embodiments the temperature and/or pressure of the steam in the module 126 may be varied with corresponding reduction or extension of the sterilization time to achieve effective sterilization.

Various alternative embodiments will now be discussed.

While certain valves and pumps are shown in FIG. 1 additional or fewer valves or pumps may be used. For example, in one embodiment the valve 138 may include more than one valve connected in parallel. The valve 138 or one valve of the valves 138 may be a bleeder-type valve permitting selective and controlled bleeding of fluid by operator control or simply when the pressure in the module 126 is above a certain pressure. In one embodiment, if the treatment pressure is desired to be 3.0 atm the bleeder valve may bleed at a pressure of 3.1 atm thereby acting a safety to prevent over-pressurization in the module 126. By the position of the valve 138 any gas that is trapped or otherwise introduced into the module 126 will be bled first thereby reducing or eliminating the volume of gas inside the module. Yet a further advantage of having the valve 138 include a bleeder valve may be that even without changing the pressure in the module 126 any air accumulating at the top 126*b* of the module may be bled without removing water from the module, such as by opening the bleeder valve in a controlled manner so that the volume of air escaping the bleeder valve is the same as the volume of additional, pressurized water conveyed to the module by the pump 122. Any valving in the system 100 may be operable by a control panel and/or hand operated to ensure safety in the event of a power outage.

In a preferred embodiment the module 126 is made of corrosion resistant metal and can withstand at least an internal pressure of 3 atm at a temperature of 170° C.

While the general location of the first fluid outlet 132 substantially at the base 126*a* of the module 126 and the general location of the second fluid outlet 134 substantially at the top 126*b* of the module is generally desired, the particular location of these or components may be varied in certain embodiments. For example, the fluid outlet 132 may be positioned higher on the module 126 and further or other means, such as a sump pump, could be used to evacuate a volume of water from the module 126.

Further still, means for delivering the breathing air and the means for receiving the spent breathing air may be part of the same means, for example, a multi-stage diving regulator or a regulator fluidly connected to a full face mask, with the full face masks fluidly connected to both the breathing air inlet and breathing air outlet.

Figure 2:
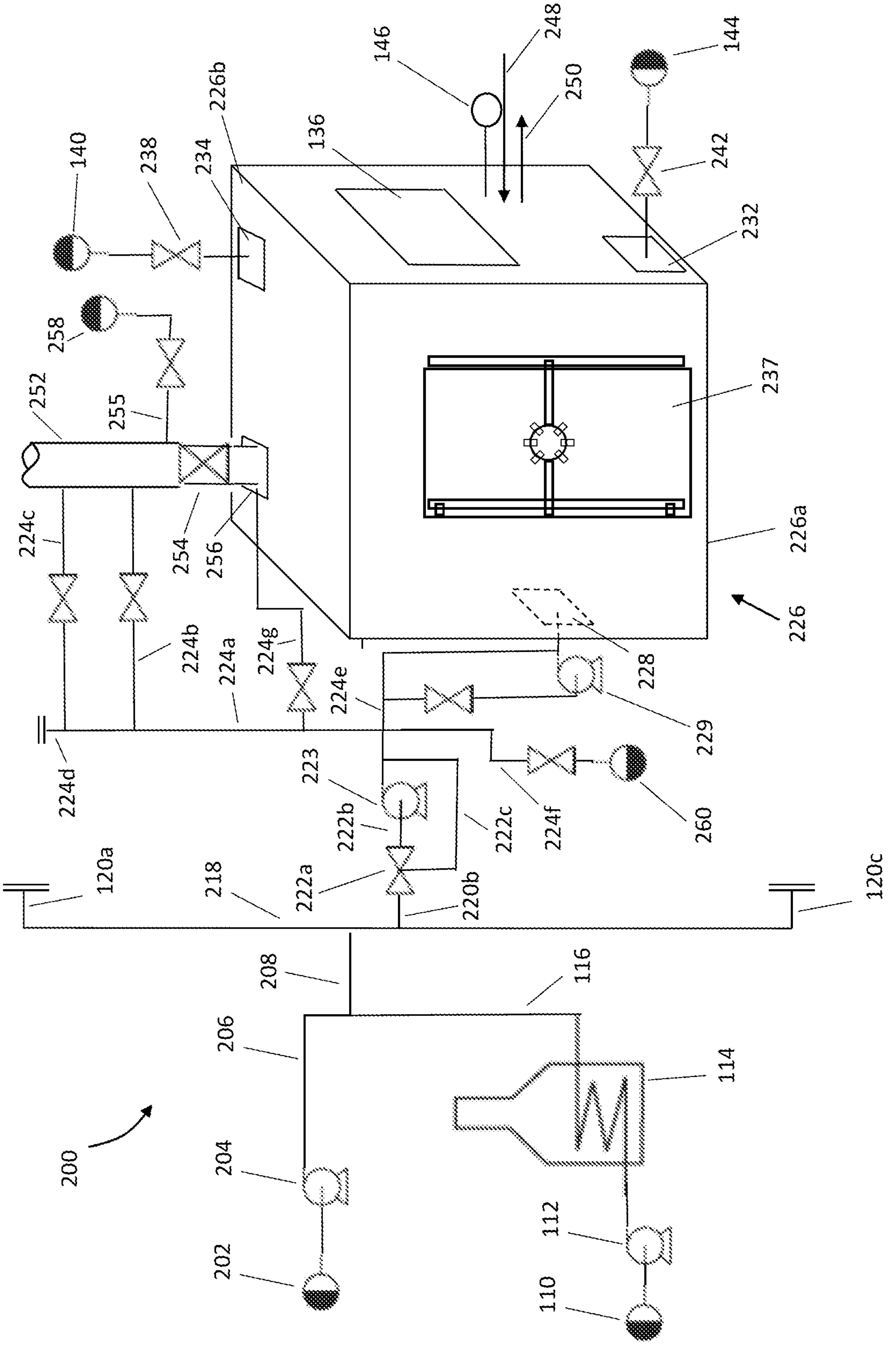
FIG. 2 is a schematic diagram of a second system having a HBOT treatment module, according to an embodiment.

Turning now to FIG. 2, FIG. 2 is a schematic diagram of a second system 200 including a module 226.

Many of the components of the system 200 are similar to, function in a similar way and have similar alternative embodiments as components of the system 100 and in certain instances are labelled with reference numerals corresponding to the 100-series reference numerals. In cases where features do not substantially differ between FIGS. 1 and 2 the 100-series reference numeral is used.

A readily observable difference in system 200 as compared to the system 100 is that the module 226 includes a column of standing water 252 extending above, and selectively and fluidly connected by a valve 254 to a top 226*b* of the module. When the valve 254 is open and the module 226 is filled with water, the column of standing water 252 pressurizes the water in the module by virtue of the weight of the water in the column of standing water being exerted on the water in the module. Although not shown in FIG. 2, the column of standing water 252 may be closed to the atmosphere at its top or have a valve selectively permitting communication of fluid from the top of the column of standing water to a fluid sink, such as the atmosphere. In a preferred embodiment the column of standing water 252 includes no elbows, turns or edges that may reduce the pressure exerted on the water in the module 226.

A further difference between the system 200 as compared to the system 100 is that the process line 224*e* and associated valving, bypass and pump 229 is optional and need not be included where sufficient pressure of the water in the module 226 may be achieved by the column of standing water 252. In embodiments where optional process line 224*e* and associated features including the pump 229 are not present and steam sterilization is contemplated, the process line 224*g* may selectively connect process line 224*a* to the fluid inlet 256.

The connectivity and structure of features of the system 200 will now be described.

Similar to FIG. 1, in FIG. 2 water is conveyed from process input 202 to pump 204 and then through process lines 206,208,218 to process line 220*b*. At process line 220*b* a valve 222*a* selectively directs liquid to a pump 223 via process line 222*b*. During optional sterilization, steam may bypass the pump 223 via bypass 222*c*.

In FIG. 2 process line 222*b* and bypass line 222*c* are fluidly connected to process lines 224*a*,222*f* and optional process line 224*e*. Process line 224*a* may communicate water, via process lines 224*b*,224*c*, having valves for controlling fluid flow to the column of standing water 252, which itself is fluidly connected with a first fluid inlet 256. Process line 224*a* is further connected to process line 224*d*, which may be connected to further process lines that may selectively connect process line 224*a* to the column of standing water 252.

A valve 254 selectively controls fluid communication between the column of standing water 252 and the fluid inlet 256 of the module 226. Although not required, FIG. 2 shows a drain line 255 between the column of standing water 252 and the process end 258 which may allow the column of standing water to be drained to a sewer.

Optional process line 224*e* communicates fluid to an optional second fluid inlet 228. Optional process line 224*g* may communicate steam to the module 226. Process line 224*f* communicates fluid to a process end 260, such as a sewer, and may be used to drain the process lines 220*b*, 222*b*,222*c*,224*a* in the event maintenance is required.

The module 226 is similar to the module 126. The module 226 generally has an entry point 237, the fluid inlet 256, a first fluid outlet 232 positioned substantially at a base 226*a* of the module, a second fluid outlet 234 positioned substantially at a top 226*b* of the module, a utilities inlet 248 and a utilities outlet 250.

Turning to how the system 200 disclosed in FIG. 2 may be used, much like with respect to the system 100 disclosed in FIG. 1 the patient is placed in the module 226. Breathing air flow is established and any desired monitoring or intervention equipment is attached to the patient. The entry point 237 is closed and sealed.

The procedure for filling the module 226 is analogous to that described for the module 126 in FIG. 1. The valve 242 connected to the first fluid outlet 232 is closed and the valve 238 connected to the second fluid outlet 234 is opened. The water is thereafter communicated into the module by the fluid inlet 256. In embodiments where the process line 224*e* is present, water may also be communicated to the second fluid inlet 228 by the pump 229. When the module 226 is substantially filled with water the valve 238 is closed.

To increase the pressure in the module 226 the level in the column of standing water 252 may be increased until a sufficient height of water exerts the desired pressure on the water in the module 226. The column of standing water 252 may not exert the full treatment pressure, but only a part thereof. In certain embodiments additional desired pressure can be added by, for example, the optional pump 229 communicating pressurized water to the second fluid inlet 228. Where pressurized water is introduced into the module 226 by the second fluid inlet 228 one or more valves, including the valves on process lines 224*b*,224*c*, and a closed end of the column of standing water 252 or a valve approximately at the top of the water column in the column of standing water, may cooperate to prevent the water in the column of standing water 252 from being displaced upwards or backwards by fluid pressure in the module 226. HBOT treatment may proceed as described herein.

To decrease the pressure in the module 226 after HBOT treatment the valves 238,242 may be opened to allow water in the module to depressurized and drain at a controlled rate. Optionally, the valve 254 may be closed and water in the column of standing water 252 may be drained to the process end 258 via the process line 255. In another embodiment the valve 254, in addition to the valves 238,242, may be open during decompression and draining and the water in the column of standing water 252 may be drained via the module 226.

Certain advantages may be achieved by having a column of standing water 252 exert all or a portion of the pressure on the water in the module 226. For example, fine control of the hydraulic pressure in the module 226 may be achieved by variations in the water level in the column of standing water 252. In embodiments where the optional pump 229 is present, less work may be required by the optional pump 229 to raise the pressure in the module to the treatment pressure.

Sterilization of the module 226 could occur by a procedure analogous to that described with respect to the module 126.

While systems and modules have been described herein, methods are also contemplated.

Figure 3:
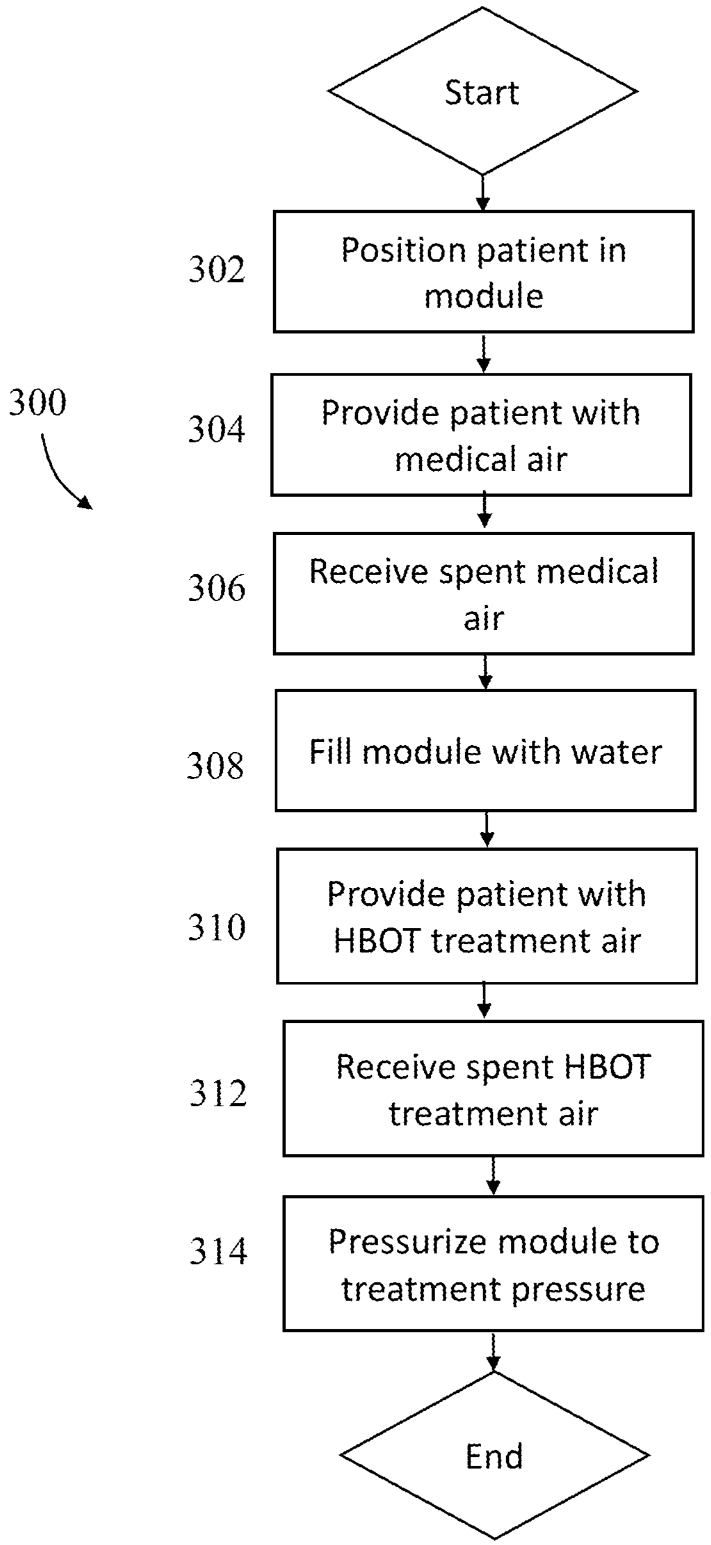
FIG. 3 is a flowchart of an exemplary method for performing HBOT on a patient submerged in pressurized water in a module where substantially no gas is present in the module, according to an embodiment.

Methods for Performing HBOT on a Patient Submerged in Pressurized Water in a Module FIG. 3 is a flowchart of an exemplary method 300 for performing HBOT on a patient submerged in pressurized water in a module where substantially no gas is present in the module, according to an embodiment.

At step 302 a patient is positioned in a module. The module may be the module 126 or the module 226 disclosed herein, or a different module.

At step 304 the patient in the module is provided with medical air via a breathing air inlet of the module connected to the patient by means for delivering breathing air to the patient, and at step 306 the spent medical air is received by a breathing air outlet of the module connected to the patient by a means for receiving spent breathing air from the patient. The means for delivering breathing air to the patient and for receiving spent breathing air from the patient may be the means described herein, such as a regulator connected to a full-face diving mask.

Once breathing air flow is established and any desired monitoring or intervention equipment is attached to the patient, an entry point of the module may be closed and sealed.

At step 308 the module is filled with water, and at steps 310 and 312 the patient is provided with HBOT treatment air by the breathing air inlet of the module and spent HBOT treatment air is received by the breathing air outlet of the module, respectively. In some embodiments the water may be chlorinated water and the HBOT treatment air may be oxygen enriched medical air or 100% oxygen. Although in the method 300 the HBOT treatment air is not provided until the module is filled with water, in embodiments where the means for receiving spent breathing air from the patient receives substantially all spent breathing air the HBOT treatment air may be provided earlier in the method 300 as there is no risk of oxygen accumulation in the module. In an embodiment where the module is located inside a building the HBOT treatment air may be then communicated to an exterior of the building to also prevent oxygen accumulation in the building.

At step 314 the hydraulic pressure in the module is increased to the treatment pressure. The treatment pressure may be between about 1.5 atm and about 4 atm, or in a particularly preferred embodiment between about 2 atm and about 3 atm. As described above, the hydraulic pressure may be increased to the treatment pressure by a pump and/or by a column of standing water extending above and fluidly connected to the module.

After the hydraulic pressure in the module is increased to the treatment pressure the patient in the module may be cycled between one or more cycles of medical air, and oxygen enriched medical air or 100% oxygen, as required. Depressurization of the module may occur by removing water from the module at a controlled rate. When sufficient water has been removed the patient may egress the module.

In certain circumstance it may be necessary to depressurize a pressurized module and drain the water module at a faster rate because, for example, the patient is in medical need of being removed from the module. In case emergency evacuation is required the module may be provided with a rapid drain line to reduced the pressure in the module quickly and drain residual water.

Figure 4:
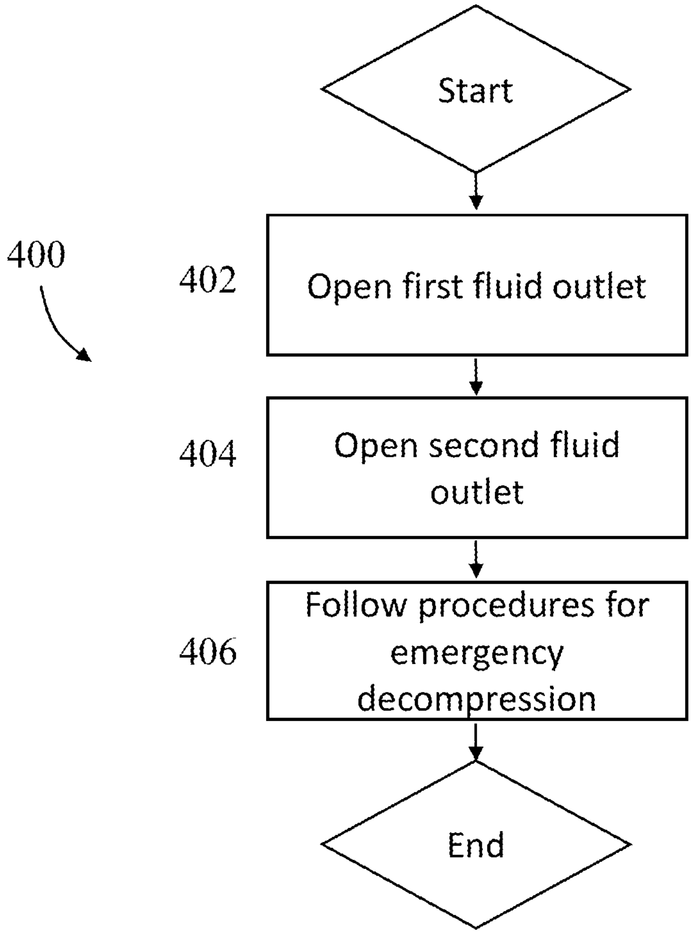
FIG. 4. is a flowchart of an exemplary method for rapidly decompressing a module disclosed herein, according to an embodiment.

FIG. 4. is a flowchart of an exemplary method 400 for rapidly decompressing a module where the module is one of the module 126 or the module 226 disclosed herein. At steps 402 and 404 both the respective first fluid outlets 134,234 and the second fluid outlets 132,232 may be opened simultaneously to rapidly drain the module. Because of the relatively incompressibility of water as compare to gas, the step of decompressing the module 126 or the module 226 may be effected quickly once the respective fluid outlets 134,234 and 132,232 are opened. At step 406, after decompression and draining of the module the patient will be treated as needed and depending on the rate of decompression experienced during emergency decompression and drainage.

EQUIVALENTS AND SCOPE

While this invention has been particularly shown and described with reference to embodiments thereof, it will be understood by those skilled in the art that various changes in form and details may be made therein without departing from the scope of the invention defined by the appended claims.

What is claimed is:

1. A sealable module for performing hyperbaric oxygen therapy ("HBOT") on a patient submerged in pressurized water where substantially no gas is present in the module for use with a regulator fluidly connected to a face mask or a helmet, the module comprising: an entry point; a fluid inlet for introducing pressurized water into the module; a first fluid outlet positioned substantially at a base of the module; a second fluid outlet positioned substantially at a top of the module; a utilities inlet comprising a breathing air inlet for delivering breathing air to the regulator fluidly connected to the face mask or the helmet for delivering the breathing air to the patient; and a utilities outlet comprising a breathing air outlet for receiving spent breathing air from the regulator fluidly connected to the face mask or the helmet for receiving the spent breathing air from the patient, wherein when the module is pressurized with pressurized water, the pressure of the pressurized water in the module is between 1.5 atm and 4 atm.

2. The sealable module of claim 1, the pressurized water being pressurized by a pump.

3. The sealable module of claim 1, the pressurized water being pressurized by a column of standing water extending above and fluidly connected to the module, with a valve disposed between the column of standing water and the fluid inlet.

4. The sealable module of claim 3, wherein the module further comprises a second fluid inlet for introducing further pressurized water to the module, the pressurized water introduced by the second fluid inlet being pressurized by a pump.

5. The sealable module of claim 4, wherein the second fluid inlet is fluidly connected to a source of steam for sterilizing the sealable module.

6. The sealable module of claim 3, wherein a drain line is disposed on the column of standing water proximal to the valve.

7. The sealable module of claim 1, wherein when the module is pressurized with pressurized water, the pressure of the pressurized water in the module is between about 2 atm and about 3 atm.

8. The sealable module of claim 1, wherein the fluid inlet is fluidly connected to a source of steam for sterilizing the sealable module.

9. The sealable module of claim 8, wherein the source of steam comprises a source of distilled water being passed through a boiler.

10. The sealable module of claim 1, wherein the breathing air is any one of: medical air, oxygen enriched medical air, and 100% oxygen.

11. The sealable module of claim 1, wherein the utilities outlet further comprises one or more connections adapted for any one or more of: measuring pressure in the module, measuring temperature in the module and measuring water level in the module.

12. The sealable module of claim 1, wherein the utilities inlet and utilities outlet comprise one or more connections adapted for any one or more of: providing an Intravenous Line ("IV") to the patient, connecting an Electrocardiogram ("ECG") monitor to the patient, connecting a pulse oximeter to the patient, and providing suction drainage to the patient.

13. The sealable module of claim 1, wherein the module further comprises a window adapted to permit visual monitoring of the patient.

14. The sealable module of claim 1, wherein the module is selectively fluidly connected to one or more further modules.

15. The sealable module of claim 1, wherein the water is chlorinated water.

16. A method for performing hyperbaric oxygen therapy ("HBOT") on a patient submerged in pressurized water, the method comprising utilizing the sealable module of claim 1 where substantially no gas is present in the sealable module.

17. A system for performing hyperbaric oxygen therapy ("HBOT") on a patient submerged in pressurized water in a module where substantially no gas is present in the module, the system comprising:

a sealable module according to claim 1;

a pump for providing pressurized water to the sealable module; and a source of steam for sterilizing the sealable module for providing pressurized steam to the sealable module for sterilizing the module.

18. A system for performing hyperbaric oxygen therapy ("HBOT") on a patient submerged in pressurized water in a module where substantially no gas is present in the module, the system comprising:

a sealable module according to claim 1;

a column of standing water for providing pressurized water to the sealable module; and a source of steam for sterilizing the sealable module for providing pressurized steam to the sealable module for sterilizing the module.

* * * * *